June 14, 1960  J. A. BUVELOT  2,940,774
SLIDABLE FIFTH WHEEL MOUNTING
Filed June 7, 1957  2 Sheets-Sheet 1
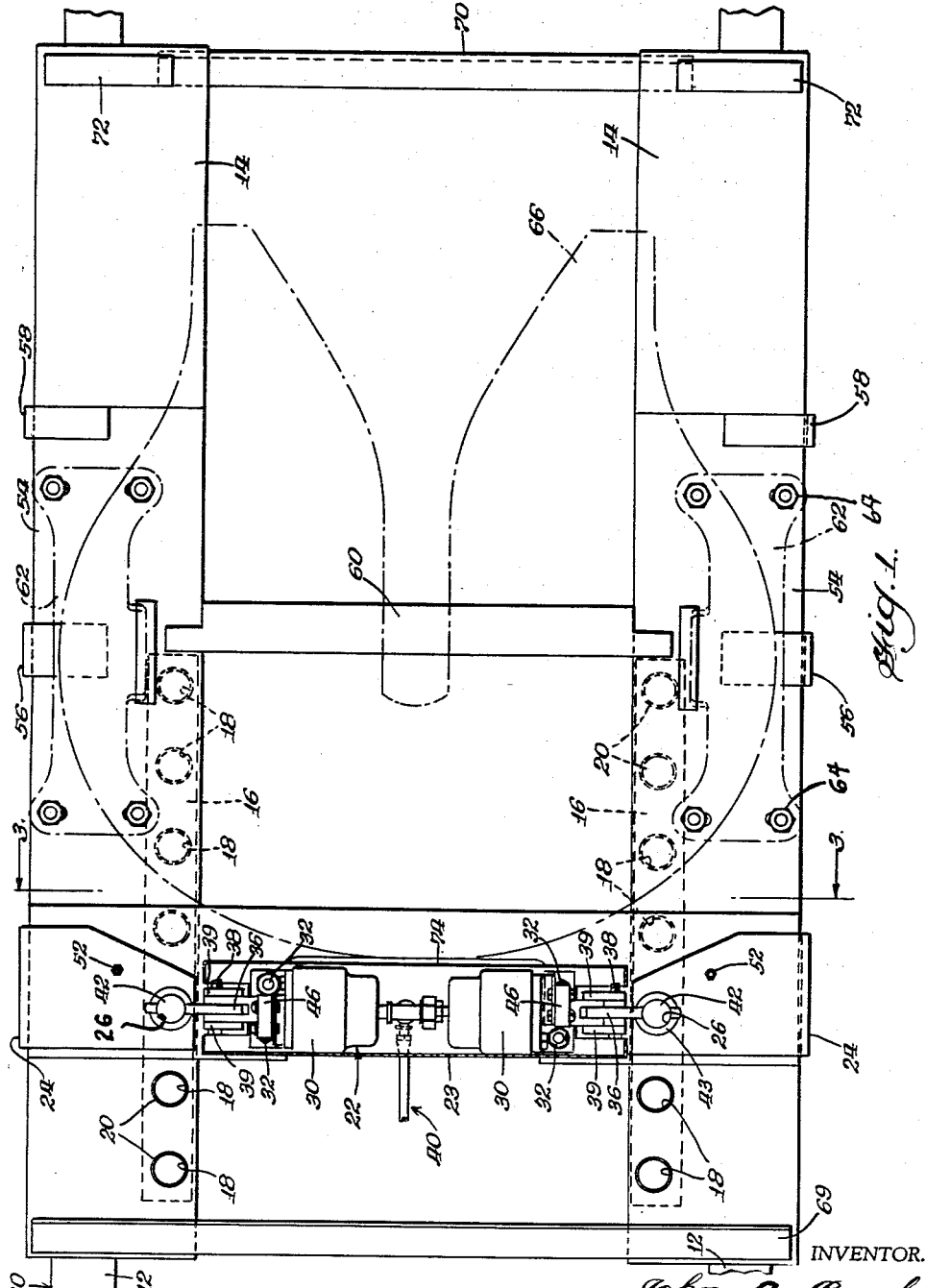
INVENTOR.
John A. Buvelot
BY Walter J. Schlegel, Jr
Atty.
Witness:
William N. Ember

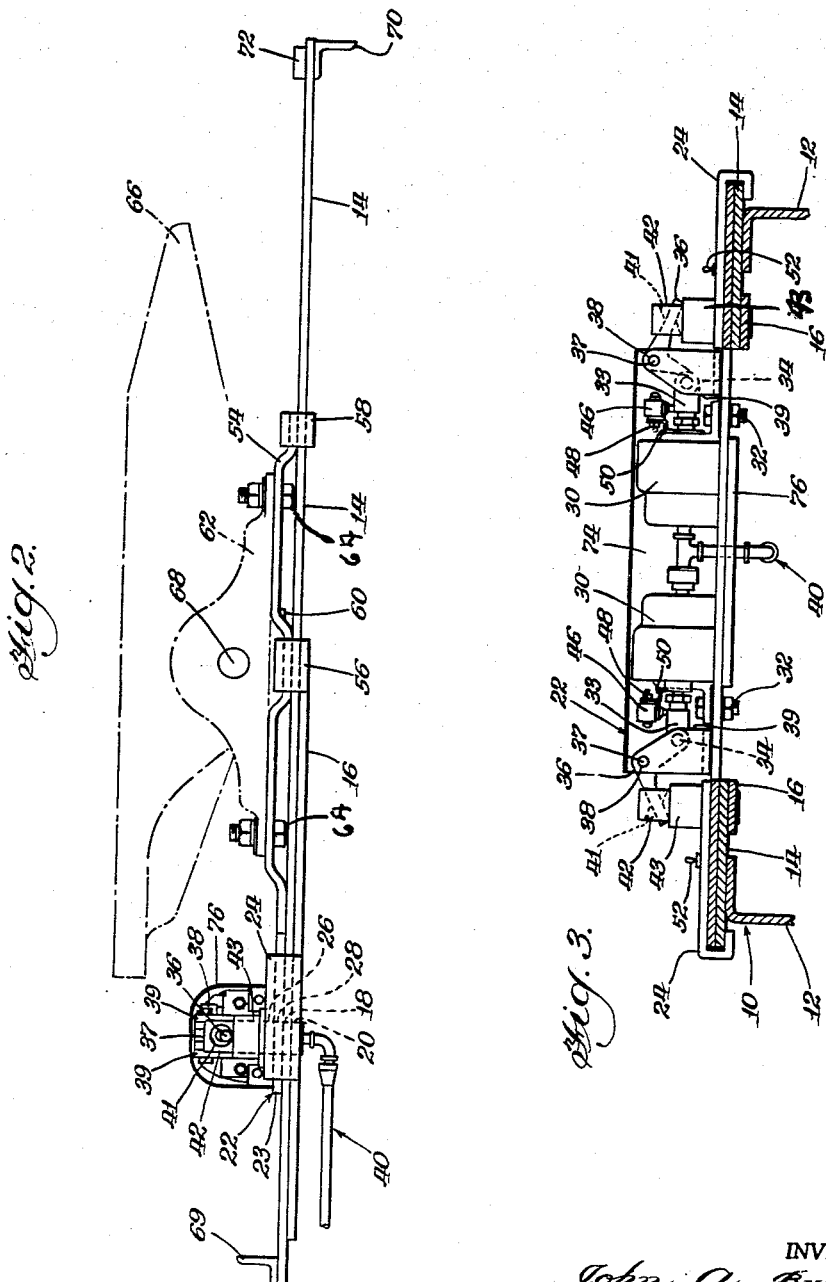

United States Patent Office 2,940,774
Patented June 14, 1960

2,940,774

SLIDABLE FIFTH WHEEL MOUNTING

John A. Buvelot, Chicago, Ill., assignor to American Steel Foundries, Chicago, Ill., a corporation of New Jersey Filed June 7, 1957, Ser. No. 664,282

2 Claims. (Cl. 280—405)

This invention relates to fifth wheel construction for trailer trucks and, more particularly, to a fifth wheel, selectively movable longitudinally along the frame of the trailer truck.

It is, therefore, an object of my invention to provide a fifth wheel construction for trailer trucks, which may be unlocked to permit adjustment thereof.

It is another object of my invention to provide a slidable fifth wheel construction which is simple, yet rugged, so as to provide selective adjustment thereof and which may be operated from the interior of the cab of the trailer truck.

Another object of this invention is to provide a slidable fifth wheel construction which may be selecetively movable longitudinally of the frame of the trailer truck upon which it is mounted to any one of a number of selected positions, and which may be locked in the selected position.

A further object is to provide a compact and unitary slidable fifth wheel mounting which may be readily assembled or disassembled from the frame of the trailer truck.

A still further object of this invention is to provide a unitary slidable fifth wheel arrangement which may be operated from the interior of the cab but which may include a signalling device to indicate to an operator that the arrangement is in an unlocked position when desired to be so.

These and other objects will become apparent from the following description, and from the discussion therein with respect to the accompanying drawings, in which:

Figure 1 is a plan view of a fifth wheel sliding mount construction embodying features of my invention wherein the mounting bracket and the fifth wheel are shown in phantom;

Figure 2 is a side elevational view of the embodiment of Figure 1, and

Figure 3 is a transverse sectional view taken along line 3—3 of Figure 1.

It will be noted that in the interest of clarity, certain parts have been omitted from certain views as they will be adequately disclosed in the views in which they appear.

Hereinafter, the terms "truck" and "tractor," "front" and "left," and "right" and "rear" may be used synonymously.

Referring now to the drawings, and more particularly, to Figure 1, there is shown a partial portion of a trailer truck, generally indicated at 10, and which may comprise the usual longitudinally extending, horizontally disposed frame members 12. There may be secured to frame members 12, as by welding, slide plates 14 which may extend from front to rear of frame members 12. The inboard and outboard edges of plates 14 may overhang frame members 12. Located on the bottom of each slide plate 14 and disposed inboardly of each frame member 12 may be secured, as by welding, a reinforcing bar 16. Each slide plate 14 may comprise a plurality of longitudinally spaced openings 18 in registry or alignment with similar openings 20 which may be disposed in the related reinforcing bar 16. Each opening 18 in slide plate 14 may be in transverse alignment with an opening 18 in the other slide plate 14, which, consequently, results in the openings 20 of both reinforcing bars 16 being in transverse alignment with each other.

A U-shaped power support assembly 22 may comprise a selectively movable assembly plate 23 which may be disposed transversely to the frame members 12, and which may be slidably engageable with slide plates 14. The assembly plate 23 preferably extends between the outboard edges of slide plates 14. Assembly plate 23 may be retained in sliding engagement with slide plates 14 by L-shaped retainers 24 which are preferably secured, as by welding, to the outboard edges of assembly plate 23. As will be seen in Figures 1 and 2, L-shaped retainers 24 may comprise vertical openings 26 in transverse alignment with each other and which may be disposed in registry with vertically aligned openings 28 in assembly plate 23. As assembly plate 23 may be slidably movable longitudinally of slide plates 14, registry of openings 26 and 28 with openings 18 and 20 must, consequently, occur.

A pair of power cylinders 30 may be rigidly secured, as by nut and bolt assemblies 32, to the upper surface of assembly plate 23. The power cylinders 30 are preferably disposed in such a manner that motion of a pair of piston rods 33 in power cylinders 30 may be directed towards the outboard edges of assembly plate 23. As best seen in Figure 3, the outboard end of each piston rod 33 may be connected, as by a roll pin connector 34, to a bell-crank lever 36. The fixed fulcrum 37 of the bell-crank lever 36 may be secured, as by a roll pin connector 38, to a pair of fulcrum brackets 39 which may be disposed on opposite sides of bell-crank lever 36 and which are preferably secured, as by welding, to assembly plate 23.

For those familiar in the art, it may be known that movement of the junction of piston rods 33 and bell crank lever 36 may be limited to arcuate movement. For this reason, the pistons (not shown) and piston rods 33 may be permitted limited rotation movement with respect to cylinders 30 so as to permit limited arcuate movement of the ends of piston rods 33 with respect to the fixed fulcrums 37.

Disposed between the inboard ends of power cylinders 30 may be a common supply line unit 40 for supplying a source of fluid pressure for actuation of cylinders 30. The supply line 40 may be connected, as shown, but may be disposed in any convenient manner so as to eliminate the possibility of interference of the supply line unit 40 with the construction of the fifth wheel mounting during movement of the fifth wheel mounting.

The outboard end of each bell-crank lever 36 may be disposed in a slot 41 of a locking pin 42, which may be vertically disposed in a guide 43 comprising an opening 44 in registry with opening 26 and which guide 43 may be secured, as by welding, to retainer 24. The length of locking pin 42 may be of sufficient length so as to afford contact of locking pin 42 with opening 20 of reinforcing bar 16 when the fifth wheel mounting is in a locked position.

A signal light switch 46 may be disposed above each piston rod 33 and secured, as by nut and bolt assemblies 48, to a signal light bracket 50 which may be carried in any convenient manner by power cylinder 30. A signal light (not shown) may be disposed on the dash of the tractor (not shown) which may be electrically connected to the signal light switches 46, the operation of which will be hereinafter described.

Each L-shaped retainer 24 may be provided with a grease fitting 52 to reduce friction and to eliminate rust which may tend to oppose longitudinal movement of assembly plate 23 with respect to slide plate 14.

A pair of corrugated side plates 54 may extend longitudinally on slide plates 14 and be slidably engaged therewith. The left ends of corrugated side plates 54 are preferably secured, as by welding, to the right ends of assembly plate 23 with the result that movement of the fifth wheel construction depends on movement of the power support assembly 22 and the corrugated side plates 54 together and in the same direction.

L-shaped retainers 56 and 58 may be secured, as by welding, to the center and right end, respectively, of each corrugated side plate 54 for maintaining sliding engagement of said corrugated side plates 54 with respect to the slide plates 14.

An alignment bar 60 may be located susbtantially centrally of corrugated side plates 54 and which bar 60 may extend transversely to frame members 12. The ends of alignment bar 60 may be rigidly secured in any appropriate manner, such as by welding, to the inboard sides of corrugated side plates 54, in order to maintain alignment thereof.

Support brackets 62 may be disposed longitudinally of corrugated side plates 54 and may be secured, as by nut and bolt assemblies 64 thereon. A fifth wheel 66 may be pivotally secured as at 68 to support bracket 62.

End braces 69 and 70 may be rigidly secured to the front and rear, respectively, of the fifth wheel construction. Stop blocks 72 may be rigidly secured to the right ends of slide plates 14 to preclude accidental removal of the fifth wheel construction therefrom.

A top plate 74 and a bottom cover plate 76 (Figure 3) may be disposed above and below power cylinders 30 and may be carried by assembly plate 23 for protection of power cylinders 30 and signal light switch 46 from adverse weather conditions.

In operation, in order to vary the overall length of the trailer truck 10 and a trailer (not shown) coupled thereto upon the fifth wheel 66 between the limits as shown in Figure 1, it may be necessary to supply a source of fluid pressure through the common supply line unit 40 to power cylinder 30 in order to actuate piston rods 33. Actuation of piston rods 33 in turn causes bell-crank levers 36 to rotate about fixed fulcrums 37. Consequently, as levers 36 rotate, the outboard ends, thereof, raise locking pins 42 which in turn may remove locking pins 42 from registry in openings 18 and 20 in slide plates 14 and reinforcing bars 16, respectively. With the locking pins 42 withdrawn from openings 18 and 20, the operator may move the trailer truck 10 relative to the coupled trailer (not shown) to thereby cause the fifth wheel construction to move longitudinally of the frame members 12, which may, of course, carry the fifth wheel 66 therewith to a selected position within the confines of the end brace 69 and stop blocks 72.

The source of fluid may then be eliminated which may allow piston rods 33 to return to their normal released position because of the action of springs (not shown) located internally of power cylinders 30, and which springs are disposed around piston rods 33. The return of the pistons (not shown) to their released position results in reverse rotation of bell-crank levers 36 which, thereby, lowers locking pins 42 into selected registered openings 18 and 20 of slide plates 14 and reinforcing bar 16, respectively.

It was heretofore stated that arcuate movement of the ends of the piston rods 33 may occur during the outboard movement of said piston rods 33. When vertical displacement occurs, contact between piston rods 33 and signal light switch 46 may be eliminated thereby closing the contacts (not shown) of the switch 46 with the result that the light on the dash of the tractor (not shown) may go on so as to indicate to the operator that the fifth wheel construction is in an unlocked position. When the locking pins 42 are in registry, contact between piston rods 33 and signal light switch 46 is again effected so as to open the contacts (not shown) of the switch 46 with the result that the light on the dash of the tractor (no shown) may, of course, be off, which is an indication that both locking pins 42 may be in their normal locked position.

It will be understood that the invention comprises a somewhat U-shaped slidable fifth wheel mounting assembly 22 comprising members 23 and 54 and the parts supported thereby as heretofore described. This novel construction comprises a unitary and compact arrangement which may be secured or removed from the frame of the trailer truck as a unit and which thereby provides a simple, economical, and readily maintainable unit for connecting trailer trucks to tractors.

As many changes could be made in the above constructions without departing from the scope of the invention, it is intended that all matter contained in the above description and shown in the accompanying drawings may be interpreted as illustrative and not as limiting the scope of the invention.

I claim:

1. In a fifth wheel mounting for a trailer truck, the combination of: transversely spaced longitudinally extending slide plates fixably supported to said truck and having longitudinally spaced openings therethrough, a support assembly slidably supported on said slide plates, locking means disposed on the support assembly for interlocking said assembly with said slide plates, said means comprising guide means presented by the support assembly and a locking pin vertically movable therein, said pin being aligned longitudinally and being selectively registable with said openings, said pin having a slot extending transversely therethrough, power cylinder means mounted on said support assembly, a bell crank lever supported by the support assembly and having one end thereof connected to the power cylinder means, the other end thereof extending through said slot and being slidably engageable therein with said pin, and a fifth wheel device mounted on said support assembly.

2. In a fifth wheel mounting for a trailer truck having longitudinally extending frame members, the combination off: transversely spaced longitudinally extending slide plates fixably supported by the frame members and having longitudinally extending transversely aligned openings, respectively, a support assembly slidably supported by said slide plates, retainer plates disposed on the support assembly and in overlapping and underlying relationship with the side and bottom of the slide plates, respectively, locking means disposed on the support assembly, said means comprising locking pins vertically movable in guide means presented by the support assembly, respectively, said pins being transversely aligned with each other and being spaced as to be selectively registrable with said openings, respectively, said pins having mutually aligned slots, power cylinder means mounted on said assembly plate and comprising oppositely acting pistons each having its related piston rod, respectively, bell crank levers fulcrumed to the support assembly and having corresponding ends thereof connected to the respective piston rod, the opposite corresponding ends of said levers extending through said slots respectively, and being in slidable engagement therein with said pins, and a fifth wheel device mounted to said support assembly.

References Cited in the file of this patent

UNITED STATES PATENTS

| | | |
|---|---|---|
| 2,387,625 | Walther et al. | Oct. 23, 1945 |
| 2,589,678 | DeLay | Sept. 1, 1953 |
| 2,713,500 | Flynn | July 19, 1955 |
| 2,750,207 | Greenway | June 12, 1956 |
| 2,755,104 | Braunberger | July 17, 1956 |
| 2,799,516 | Greenway | July 16, 1957 |
| 2,819,096 | Sencenich | Jan. 7, 1958 |